Nov. 7, 1933.          E. F. HUDDLE          1,933,909
PITMAN
Filed Feb. 17, 1933

INVENTOR.
EDWIN F. HUDDLE
BY James A. Walsh,
ATTORNEY

UNITED STATES PATENT OFFICE 1,933,909

PITMAN

Edwin F. Huddle, Rockford, Ill., assignor to J. I. Case Company, Racine, Wis., a corporation Application February 17, 1933. Serial No. 657,162

5 Claims. (Cl. 287—89)

The object of my invention is to provide an improved pitman for agricultural implements, such as mowers and the like, consisting in novel means for connecting the strap members thereof to the knife-head of the cutter-bar whereby wear of certain parts may be readily compensated for, and other advantages will be apparent from the following description.

Figure 1:
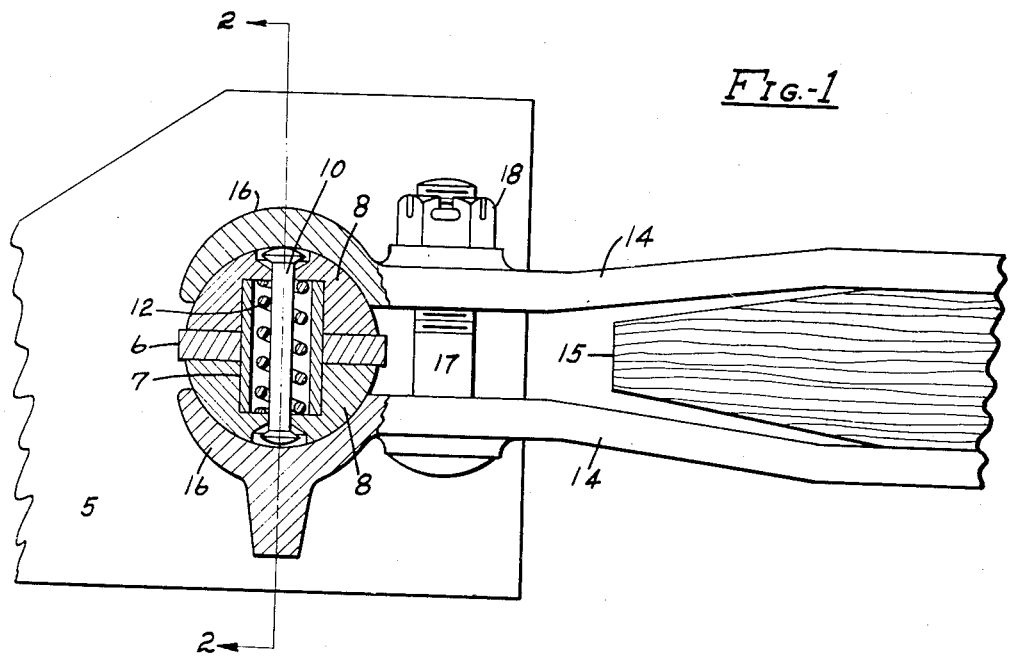
Figure 2:
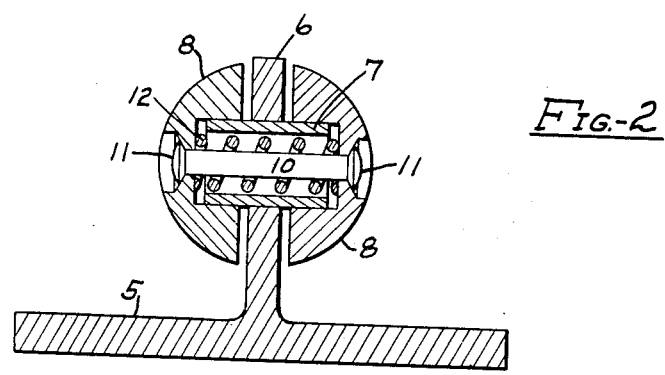

In the accompanying drawing, forming part hereof, Figure 1 is a sectional plan view of one end of a pitman attached to a knife-head; Fig. 2 is a detail section taken on the dotted line 2—2 in Fig. 1 showing the knife-head and assembled parts before securing the straps thereto; and Fig. 3 is a sectional view of a modified form of my improvement.

In said drawing the numeral 5 indicates the knife-head embodying a vertical member 6 in which preferably I tightly press fit a tubular member 7, or such tube may form an integral part of the knife-head, and at the opposite ends of said tube semi-spherical or ball halve bearings 8 are loosely mounted. Each of said bearings has a countersunk opening therethrough for receiving a rivet 10 having heads 11 at its ends adapted to be seated in the countersunk openings, and about which rivet an expansion spring 12 is encircled and retained in the tube 7, the relation of the spring and bearings before applying the pitman straps 14 being indicated in Fig. 2.

The straps 14 are composed of resilient metal and are secured to the pitman bar 15 in any well known or desired manner, and which straps terminate in curved ends 16 adapted to be clamped about the semi-spherical bearings 8 by a suitable bolt, as 17, passing through the straps and fastened by a nut 18 which may be tightened or loosened to engage the strap ends with the bearings as desired. In Fig. 1 it will be noted that the parts are in compact assembled relation due to the expansion action of spring 12 and the clamping of the straps by the bolt 17, and that by simply adjusting the bolt wear between the connected parts will be automatically taken up. The length of the rivet controls the outward movements of the bearings, and spring 12 constantly exerts a thrust against the bearings when the parts are assembled as shown in Fig. 1 to provide a tight fit between the bearings and strap ends 16.

Figure 3:
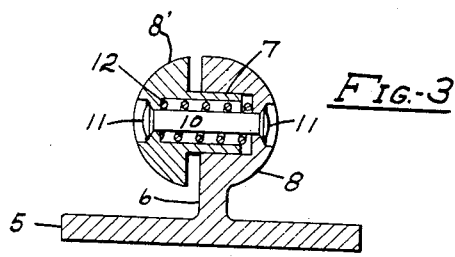

In Fig. 3, showing a modified form of my improvement, it will be noted that the knife-head and one of the bearings, as 8, having a recess therein may be integrally formed, and the opposite bearing 8' having a recess therein and provided with a tubular extension 7 adapted to fit into the recess of bearing 8 may be yieldingly assembled with the latter bearing by the rivet 10 and spring 12 in substantially the manner as shown in Fig. 2.

I claim as my invention:

1. In a pitman, supporting means having a tube, yielding means in the tube, bearing members on each end of the tube, and means extending through said bearings, tube and yielding means for maintaining said parts in assembled relation.

2. In a pitman, supporting means, a tube transversely positioned in the supporting means, a coil spring in the tube, semi-spherical bearings on each end of the tube, and means extending through said bearings, spring and tube for maintaining said parts in assembled relation.

3. In a pitman, a tubular member, bearings on each end of said member, a spring in the tubular member, and means extending through said bearings, tube and spring for maintaining said parts in assembled relation.

4. In a pitman, supporting means, a tube associated with the support, bearings on each end of the tube said bearings having countersunk openings therein, a spring in the tube, and a rivet extending through the spring and tube and having heads at its ends adapted to be seated in the countersunk openings.

5. In a pitman, supporting means having a tubular member secured thereto, semi-spherical bearings loosely mounted on the ends of the tube, yielding means in the tube, and a fastening device in the tube engaging said bearings and so positioned in relation thereto that the bearings will be urged away from the support by the yielding means.

EDWIN F. HUDDLE.